June 5, 1951 A. TLUSTÝ 2,555,460
AUTOFOCUS ENLARGER
Filed Oct. 16, 1947 2 Sheets-Sheet 2

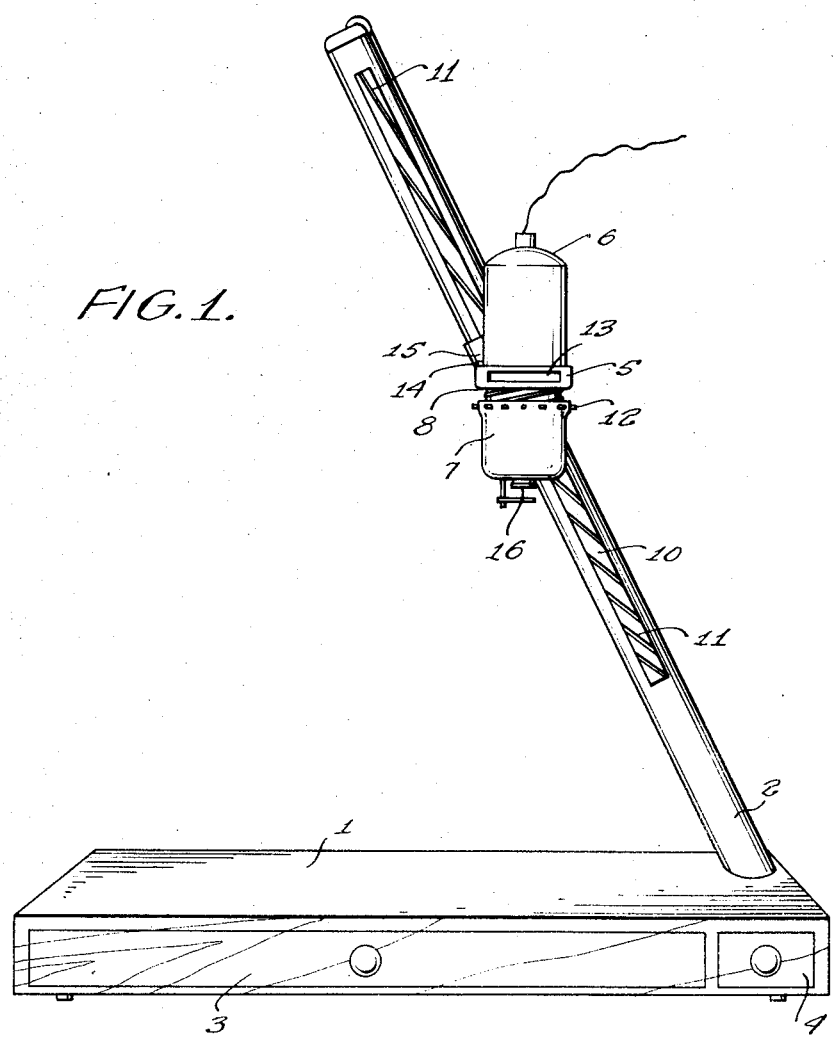

INVENTOR.
Antonin Tlustý
BY

Patented June 5, 1951

2,555,460

UNITED STATES PATENT OFFICE 2,555,460

AUTOFOCUS ENLARGER

Antonín Tlustý, Tabor, Czechoslovakia

Application October 16, 1947, Serial No. 780,167
In Czechoslovakia March 22, 1947

2 Claims. (Cl. 88—24)

The present invention relates to an autofocus enlarger.

The accompanying drawings show one embodiment of the invention.

Fig. 1 shows a side view of the autofocus enlarger according to my present invention;

Figure 4:
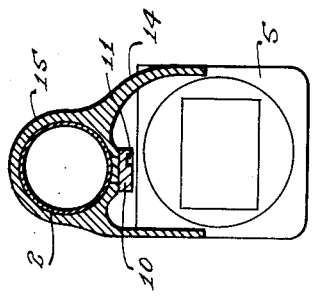
Fig. 4 is a section along line A—B of Fig. 2.
Figure 3:
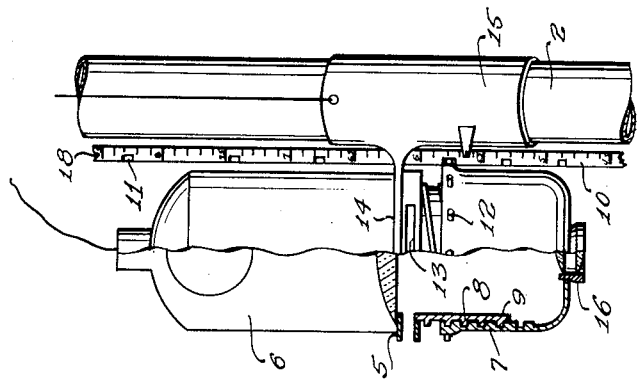
Fig. 3 is a view at right angle in relation to the view according to Fig. 1 or 2.

In the embodiment shown the inclined standard 2 is mounted on the stationary support plate 1. On the standard 2 the photographic arrangement is slidably mounted, said arrangement consisting of carrier means 5, carrying the lamp housing 6 and the objective housing 7, which is turnably attached by screw-threading 8, 9 to the tubular extension 9 of the carrier means 5. These carrier means include the arm 13 carrying housing 7, the arm 14 carrying housing 6 and sleeve 15 slidably attaching both arms 13 and 14 to standard 2.

Figure 2:
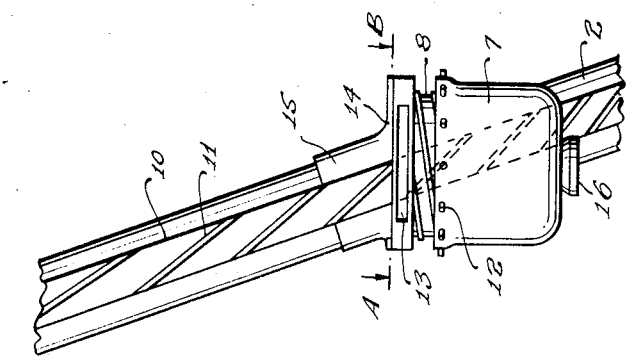
Fig. 2 is a side-view of a part of the focussing device in detail, seen from the same side as in Fig. 1.

As shown in Figures 1 and 2, consecutive guiding grooves 11 are arranged on the flat bar 10 mounted on the standard 2 so as to engage consecutively the turning pins 12 mounted on the objective housing 7 as shown in the drawing the inclination of the guiding grooves 10 is increasing in upward direction.

During sliding of the entire photographic arrangement along the standard, the guiding grooves 11 force the pins 12 to turn, resulting in turning of the objective housing 7 and objective lens 16 and causing by means of screw-threading 8, 9 permanent focusing of the lens.

The bar 10 might be provided with a scale 18 indicating the magnification attainable in various positions of the photographic arrangement.

Having now particularly described and ascertained the nature of my said invention, and in what manner the same is to be performed, I declare that what I claim is:

1. An autofocus enlarger comprising in combination a stationary support plate; an inclined standard rising from said stationary support plate and forming an acute angle with said stationary support plate; a photographic arrangement; carrier means attaching said photographic arrangement to said inclined standard, slidable along the same with its optical axis permanently normal to said stationary support plate; a plurality of consecutive guiding members arranged on said inclined standard facing said photographic arrangement; lens means; means threadedly attaching said lens means to said photographic arrangement so as to be adapted for focusing by turning about the optical axis of said photographic arrangement; and a plurality of spaced turning members arranged in a plane parallel to said stationary support plate surrounding said lens means and secured thereto, said turning members arranged and spaced in such a manner as to be adapted to consecutively engage said consecutive guiding members on said inclined standard upon different positions of said carrier means whereby the position of said lens means is automatically varied for exact focusing of said lens means with respect to said stationary support plate during sliding of said carrier means together with said photographic arrangement along said inclined standard.

2. An autofocus enlarger comprising in combination a stationary support plate; an inclined standard rising from said stationary support plate and forming an acute angle with said stationary support plate; a photographic arrangement having an optical axis; lens means; attaching means attaching said lens means to said photographic arrangement turnably about the optical axis of said photographic arrangement; carrier means holding said photographic arrangement and attaching it together with said lens means attached thereto; to said inclined standard slidably along the same with its optical axis permanently normal to said stationary support plate; a plurality of consecutive guiding members arranged on said inclined standard extending in longitudinal direction thereof and facing said photographic arrangement and said lens means attached thereto; and a plurality of spaced turning members directly secured to said lens means surrounding the same and arranged and spaced in such a manner as to be adapted to consecutively engage said consecutive guiding members on said inclined standard upon different positions of said carrier means whereby the position of said lens means is automatically varied for exact focusing of said lens means with respect to said stationary support plate during sliding of said carrier means together with said photographic arrangement along said inclined standard.

ANTONÍN TLUSTÝ.

REFERENCES CITED

The following references are of record in the file of this patent:

UNITED STATES PATENTS

| Number | Name | Date |
|---|---|---|
| 1,423,997 | Collier | July 25, 1922 |
| 2,076,552 | Draeger | Apr. 13, 1937 |
| 2,380,818 | Young-Berg | July 31, 1945 |
| 2,397,668 | Kesses | Apr. 2, 1946 |
| 2,418,230 | Jacobson | Apr. 1, 1947 |

FOREIGN PATENTS

| Number | Country | Date |
|---|---|---|
| 423,111 | Germany | Dec. 22, 1925 |
| 586,133 | Germany | Oct. 17, 1933 |
| 786,406 | France | June 8, 1935 |